US012718016B2

(12) United States Patent
Saeedi et al.

(10) Patent No.: US 12,718,016 B2
(45) Date of Patent: Aug. 25, 2026

(54) SYSTEMS AND METHODS FOR UTILIZING TOPIC MODELS TO WEIGHT MIXTURE-OF-EXPERTS FOR IMPROVEMENT OF LANGUAGE MODELING

(71) Applicant: UnitedHealth Group Incorporated, Minnetonka, MN (US)

(72) Inventors: Ardavan Saeedi, Jersey City, NJ (US); Eran Halperin, Santa Monica, CA (US); Joel David Stremmel, Iowa City, IA (US); Hamid Reza Hassanzadeh, Suwanee, GA (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 454 days.

(21) Appl. No.: 18/311,608

(22) Filed: May 3, 2023

(65) Prior Publication Data

US 2024/0211687 A1 Jun. 27, 2024

Related U.S. Application Data

(60) Provisional application No. 63/476,690, filed on Dec. 22, 2022.

(51) Int. Cl.
*G06F 40/284* (2020.01)
*G06F 40/274* (2020.01)

(52) U.S. Cl.
CPC .......... *G06F 40/284* (2020.01); *G06F 40/274* (2020.01)

(58) Field of Classification Search
CPC ...... G06F 40/284; G06F 40/274; G06F 40/30; G06N 7/01; G06N 20/00
USPC .......................................................... 704/9
See application file for complete search history.

(56) References Cited

U.S. PATENT DOCUMENTS

| | | | | |
|---|---|---|---|---|
| 10,719,761 | B2 | 7/2020 | Shazeer et al. | |
| 11,450,126 | B1 * | 9/2022 | Yu | G06F 18/22 |
| 11,921,768 | B1 * | 3/2024 | Ganesh | G06N 3/02 |
| 12,067,363 | B1 * | 8/2024 | Ciolek | G06F 40/242 |
| 12,197,863 | B2 * | 1/2025 | Salahi | G06F 18/2413 |
| 2015/0046151 | A1 * | 2/2015 | Lane | G06F 16/358 704/9 |

(Continued)

FOREIGN PATENT DOCUMENTS

| | | | |
|---|---|---|---|
| CN | 113590849 | A | 11/2021 |
| WO | 2022161202 | A1 | 8/2022 |

*Primary Examiner* — Paras D Shah
*Assistant Examiner* — Fouzia Hye Solaiman
(74) *Attorney, Agent, or Firm* — Bookoff McAndrews, PLLC

(57) ABSTRACT

Systems and methods are disclosed for predicting a next text. A method may include receiving one or more documents, such as a document associated with a healthcare provider. The document is then processed to generate one or more tokens which are representative of the document. The document is then processed with a machine-learning model, such as a topic model, and a topic vector is output for the document. Based at least in a part on this topic vector, the document is then processed by one or more expert machine-learning models, which each output a probability vector. The various probability vectors are then further processed to calculate a total probability vector for the document. Based at least in part on the total probability vector for the document, a text output is selected.

18 Claims, 9 Drawing Sheets

(56) References Cited

U.S. PATENT DOCUMENTS

2020/0104733 A1* 4/2020 Bart ........................ G06N 3/02

* cited by examiner

SYSTEMS AND METHODS FOR UTILIZING TOPIC MODELS TO WEIGHT MIXTURE-OF-EXPERTS FOR IMPROVEMENT OF LANGUAGE MODELING

CROSS-REFERENCE TO RELATED APPLICATIONS

The present application claim priority to U.S. Provisional Patent Application No. 63/476,690, titled "UTILIZING TOPIC MODELS TO WEIGHT MIXTURE-OF-EXPERTS FOR IMPROVEMENT OF LANGUAGE MODELING", filed Dec. 22, 2022, the entire disclosure of which is hereby incorporated by reference.

TECHNICAL FIELD

Various embodiments of this disclosure relate generally to techniques for text prediction, and, more particularly, to systems and methods for predicting a topic and missing text of one or more documents with low perplexity.

BACKGROUND

Language modeling (LM) is a widely used technique for predicting missing words or phrases in natural language text. Such models have been applied to a variety of fields, including healthcare-related applications such as information retrieval and question answering. Improving the accuracy of LM can have a significant impact on the performance of downstream tasks.

The typical inputs for a text-predicting LM are some number of previous (and sometimes subsequent) words, and the output is a vector in which each column represents a word, and the columns collectively constitute a vocabulary of possible words. The value in each column of the output vector is a probability that the missing word (e.g., the next untyped word) is the word assigned to that column.

Performance of text-predicting LMs is often evaluated using the perplexity metric. A low perplexity score indicates that the LM yields vectors with high probabilities for a very few words in the vocabulary while yielding very low probabilities for the remaining words. Thus, a low perplexity score indicates that the LM is recommending few options with high confidence, which is desirable in LMs.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

The present disclosure solves this problem and/or other problems described above or elsewhere in the present disclosure and improves the state of conventional healthcare applications. The present disclosure teaches systems and methods for text prediction using machine-learning.

In some embodiments, the present disclosure includes receiving one or more documents, such as a document associated with a healthcare provider. The document is then processed to generate one or more tokens which are representative of the document. The document is then processed with a machine-learning model, such as a topic model, and a topic vector is output for the document. Based at least in a part on this topic vector, the document is then processed by one or more expert machine-learning models, which each output a probability vector. The various probability vectors are then further processed to calculate a total probability vector for the document. Based at least in part on the total probability vector for the document, a text output is selected.

In some embodiments, a computer-implemented method for predicting missing text is disclosed. The computer-implemented method includes: receiving, by one or more processors, a document; processing, by the one or more processors, the document, wherein the processing includes generating one or more token representative of contents of the document; processing, by the one or more processors, the document with a first machine-learning model; outputting, by the one or more processors, a topic vector based on the processing of the document with the first machine-learning model; processing, by the one or more processors, the document with one or more expert machine-learning models based on the topic vector; outputting, by the one or more processors, a string probability vector for each of the one or more expert machine-learning models for the document; calculating, by the one or more processors, based at least in part on the topic vector and the string probability vector for each of the one or more expert machine-learning models, a total probability vector for the document; and selecting, by the one or more processors, based on the total probability vector, a text output.

In some embodiments, a system for predicting missing text is disclosed. The system includes one or more processors; and at least one non-transitory computer readable medium storing instructions which, when executed by the one or more processors, cause the one or more processors to perform operations including: receiving a document; processing said document, wherein the processing includes generating one or more token representative of contents of the document; processing the document with a first machine-learning model; outputting a topic vector based on the processing of the document with the first machine-learning model; processing the document with one or more expert machine-learning models based on the topic vector; outputting a string probability vector for each of the one or more expert machine-learning models for the document; calculating, based at least in part on the topic vector and the string probability vector for each of the one or more expert machine-learning models, a total probability vector for the document; and selecting, based on the total probability vector, a text output.

In some embodiments, a computer-implemented method of generating a probability distribution is disclosed. The method includes receiving, by one or more processors, a data set; processing, by the one or more processors, the data set to generate one or more tokens representative of contents of the data set; processing, by the one or more processors, the data set with a topic model to output a topic vector comprising a plurality of probabilities, each probability associated with a topic; comparing, by the one or more processors, each probability associated with a topic against a pre-defined probability threshold for each topic; determining, by the one or more processors, for each topic, if the probability associated with the topic exceeds the pre-defined probability threshold for the topic; assigning, by the one or more processors, to the data set a topic identifier, the topic identifier including each topic for which the probability associated with the topic exceeds the pre-defined probability threshold for the topic; processing, by the one or more processors, the data set with one or more expert machine-learning models, wherein each of the expert machine-learning models is associated with a different topic; outputting, by the one or more processors, a string probability vector for each of the one or more expert machine-learning models for the data set; calculating, by the one or more processors, a total probability vector for the data set by multiplying each value within the string probability vector against an associated topic probability within the topic vector for each of the expert machine-learning models, and summing all of the adjusted string probability vectors; and selecting, by the one or more processors, a text output based on the total probability vector.

It is to be understood that both the foregoing general description and the following detailed description are example and explanatory only and are not restrictive of the detailed embodiments, as claimed.

BRIEF DESCRIPTION OF THE DRAWINGS

The accompanying drawings, which are incorporated in and constitute a part of this specification, illustrate various example embodiments and together with the description, serve to explain the principles of the disclosed embodiments.

DETAILED DESCRIPTION

Figure 1:
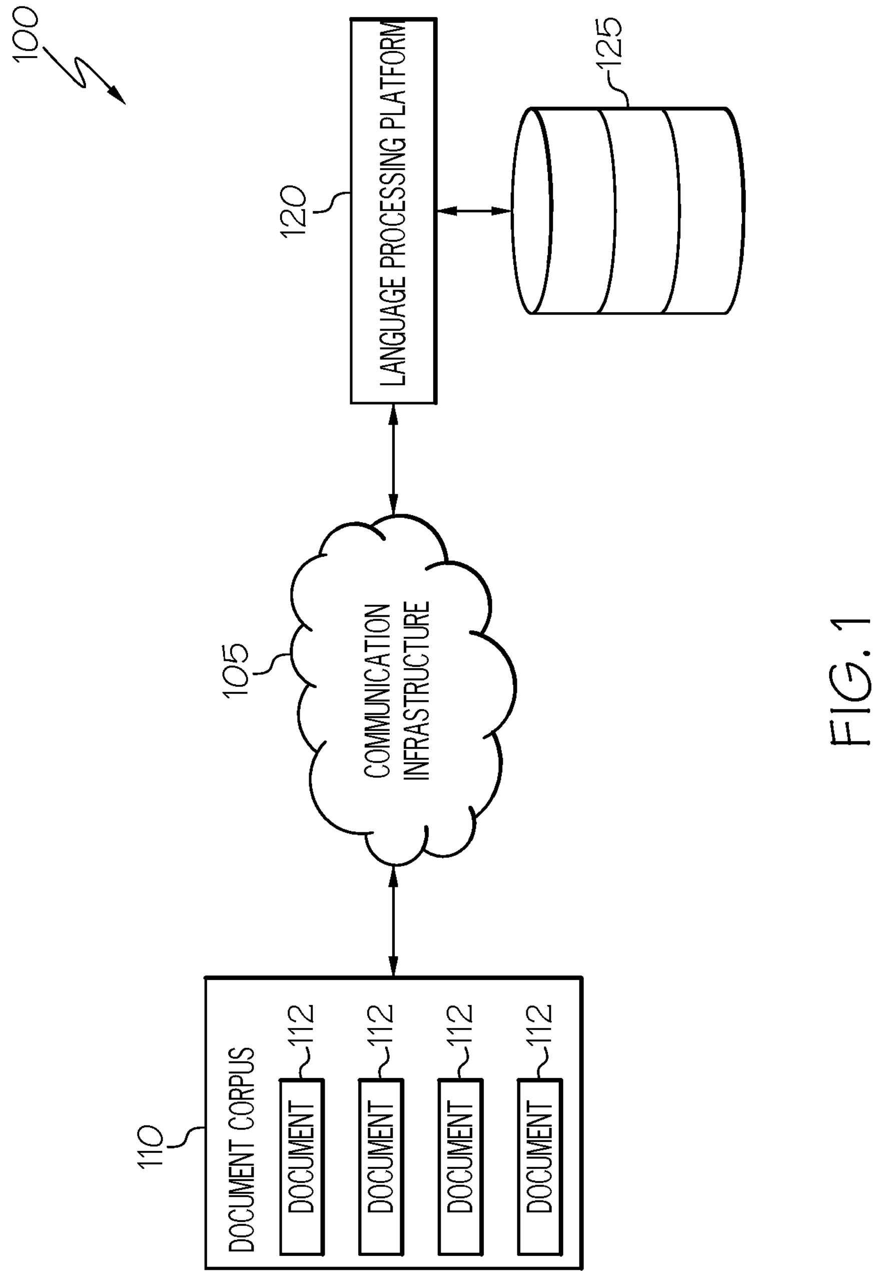
FIG. 1 is a diagram showing an example of a system that is capable of text prediction, according to some embodiments of the disclosure.

Various embodiments of this disclosure relate generally to techniques for text prediction, and, more particularly, to systems and methods for predicting a topic and missing text of one or more documents with low perplexity.

As discussed above, despite the advances in language modeling techniques, conventional LMs still face certain limitations and challenges. One major issue is the inherent difficulty in capturing the nuances and complexities of human language, which can lead to inaccuracies in predictions, particularly when dealing with ambiguous or context-dependent words and phrases. Another challenge is the resource-intensive nature of large-scale LMs, which require significant computational power and memory for training and inference. Additionally, these models may suffer from a lack of generalization when exposed to unseen data, leading to suboptimal performance in real-world applications.

Motivated from the limitations of the conventional methodology, techniques disclosed herein are geared towards lowering perplexity when assessing documents which are associated with one or more topic. By training a topic model to identify one or more topics associated with a document or a corpus of documents, a system and method is disclosed which applies each document to one or more particular expert machine-learning models. By applying the documents to expert models based on topic identification, the ambiguous or context-dependent words and phrases are assessed within the context of certain topics or with a consideration for the probability that the document relates to a certain topic, which can lower perplexity associated with generalized data sets. Additionally, this serves to address the problem with suboptimal performance due to lack of generalization, as the training and application of multiple expert models makes the system and method more robust against general datasets. The topic model can output a probability vector, which provides one or more probabilities. The probabilities relate to one or more topics and are used to weigh outputs from each expert model, which further reduce errors due to generalization and unseen data.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for predicting a next text.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of +10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," or the like, and generally encompasses software that is configured to interact with, modify, override, supplement, or operate in conjunction with other software.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine-learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

FIG. 1 is a diagram showing an example of a system that is capable of text prediction, according to some embodiments of the disclosure. Referring to FIG. 1, a network environment is depicted for processing and analyzing documents, in accordance with an embodiment of the present invention. The network environment 100 includes a communication infrastructure 105, a document corpus 110, a language processing platform 120, and a database 125.

In one embodiment, various elements of the network environment 100 communicate with each other through the communication infrastructure 105. The communication infrastructure 105 supports a variety of different communication protocols and communication techniques. In one embodiment, the communication infrastructure 105 allows the language processing platform 120 to communicate with one or more other systems, including document corpus 110, which, in some embodiments, is stored on a separate platform and/or system. The communication infrastructure 105 of the system 100 includes one or more networks such as a data network, a wireless network, a telephony network, or any combination thereof. It is contemplated that the data network is any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network is, for example, a cellular communication network and employs various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

The document corpus 110 is a collection of one or more documents 112, which can take various forms, such as text-based content, images, audio, or video, and can be stored in a variety of formats, such as plain text, PDF, HTML, XML, or other structured or unstructured data formats. The document corpus 110 can be managed and stored on one or more devices within the network environment 100, such as local or remote file servers, cloud-based storage services, or other forms of data repositories.

The language processing platform 120 enables natural language processing (NLP) techniques to be applied to the documents 112, utilizing various tools and resources such as lexicons, ontologies, corpora, and machine-learning algorithms. The language processing platform 120 can include various software applications, frameworks, or libraries that enable NLP techniques to be applied to the documents 112. The NLP techniques can include tasks such as part-of-speech tagging, named entity recognition, sentiment analysis, topic modeling, and others.

In one embodiment, the language processing platform 120 is a platform with multiple interconnected components. The language processing platform 120 includes one or more servers, intelligent networking devices, computing devices, components, and corresponding software for predicting future text. In addition, it is noted that the language processing platform 120 can be a separate entity of the system.

The database 125 is used to support the storage and retrieval of data related to the document corpus 110, storing metadata about the documents 112, such as author, date, and content type, as well as any extracted information from the language processing platform 120. The database 125 can consist of one or more systems, such as a relational database management system (RDBMS), a NoSQL database, or a graph database, depending on the requirements and use cases of the network environment 100.

In one embodiment, the database 125 is any type of database, such as relational, hierarchical, object-oriented, and/or the like, wherein data are organized in any suitable manner, including data tables or lookup tables. In one embodiment, the database 125 accesses or includes any suitable data that are utilized to predict text. In one embodiment, the database 125 stores content associated with one or more system and/or platform, such as the language processing platform 120 and manages multiple types of information that provide means for aiding in the content provisioning and sharing process. The database 125 includes various information related to documents, topics, and the like. It is understood that any other suitable data can be included in the database 125.

In one embodiment, the database 125 includes a machine-learning based training database with a pre-defined mapping defining a relationship between various input parameters and output parameters based on various statistical methods. For example, the training database includes machine-learning algorithms to learn mappings between input parameters related to the documents 112. In an embodiment, the training database is routinely updated and/or supplemented based on machine-learning methods.

The language processing platform 120 communicates with other components of the communication infrastructure 105 using well known, new or still developing protocols. In this context, a protocol includes a set of rules defining how the network nodes within the communication infrastructure 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In operation, the network environment 100 provides a framework for processing and analyzing large amounts of text-based content, leveraging the capabilities of natural language processing and database technologies to support a wide range of use cases and applications. For example, the network environment 100 can be used to perform document classification, such as identifying whether a given document is a legal contract, a research paper, or a news article. The network environment 100 can also be used to extract key information from the documents 112, or to predict a next text within one or more documents 112.

To perform these tasks, the language processing platform 120 utilizes, in some embodiments, various NLP techniques, such as named entity recognition, which identifies and categorizes named entities in text, such as people, organizations, or locations. The language processing platform 120 can also utilize topic modeling techniques, which identify and extract the main themes or topics discussed in the documents 112.

To support the storage and retrieval of data related to the document corpus 110, the database 125 can be used to store metadata about the documents 112, such as author, date, and content type. The database 125 can also be used to store any extracted information from the language processing platform 120, such as named entities or topics identified in the documents 112.

In addition to these use cases, the network environment 100 can be used to support a wide range of other applications and tasks, such as search and recommendation systems, text summarization, and data visualization. For example, the network environment 100 can be used to build a search engine that enables users to search for specific keywords or phrases within the document corpus 110, returning a list of relevant documents and information about the contexts in which the keywords or phrases appear.

In the context of the present invention, a document corpus refers to a collection of one or more documents that are related in some way. For example, the document corpus can be related to a specific topic, industry, or domain. Each document within the corpus can be associated with one or more providers, which includes authors, organizations, or entities that created or contributed to the document.

To facilitate the association of the document corpus with one or more providers, the network environment 100 utilizes various techniques, such as metadata extraction, natural language processing, or user input. For example, metadata extraction involves extracting information about the author, date of creation, and/or source of the document, which can then be used to associate the document with one or more providers. Natural language processing may involve analyzing the content of the document to identify entities or themes that are associated with particular providers. User input can involve allowing users to manually specify the provider of a document or corpus, either during the initial ingestion process or at a later time.

Once the association between the document corpus and one or more providers has been established, this information can be used in various ways within the network environment 100. For example, users can search for documents based on the provider, allowing them to quickly find relevant information related to a particular author or organization. Additionally, the provider information can be used to help users identify the credibility or reliability of the information contained within the documents.

In addition to being associated with one or more providers, each document and/or document corpus can also be associated with one or more topics. The topic of a document or corpus can be defined in various ways, such as based on the content of the document, the domain or industry it relates to, or user-defined tags or categories.

To facilitate the association of documents and/or document corpora with one or more topics, the network environment 100 can utilize various techniques, such as topic modeling, keyword extraction, or user input. For example, topic modeling can involve identifying the main themes or topics discussed within a document or corpus, and using these topics to associate the document with one or more topics. Keyword extraction involves identifying important keywords or phrases within a document or corpus, and using these keywords to associate the document with one or more topics. User input involves allowing users to manually specify the topic of a document or corpus, either during the initial ingestion process or at a later time.

Once the association between the document or corpus and one or more topics has been established, this information can be used in various ways within the network environment 100. For example, users are able to search for documents or corpora based on topic, allowing them to quickly find relevant information related to a particular theme or subject. Additionally, the topic information can be used to help users analyze and understand the content of the documents, by identifying the main themes or topics discussed within them.

Figure 2:
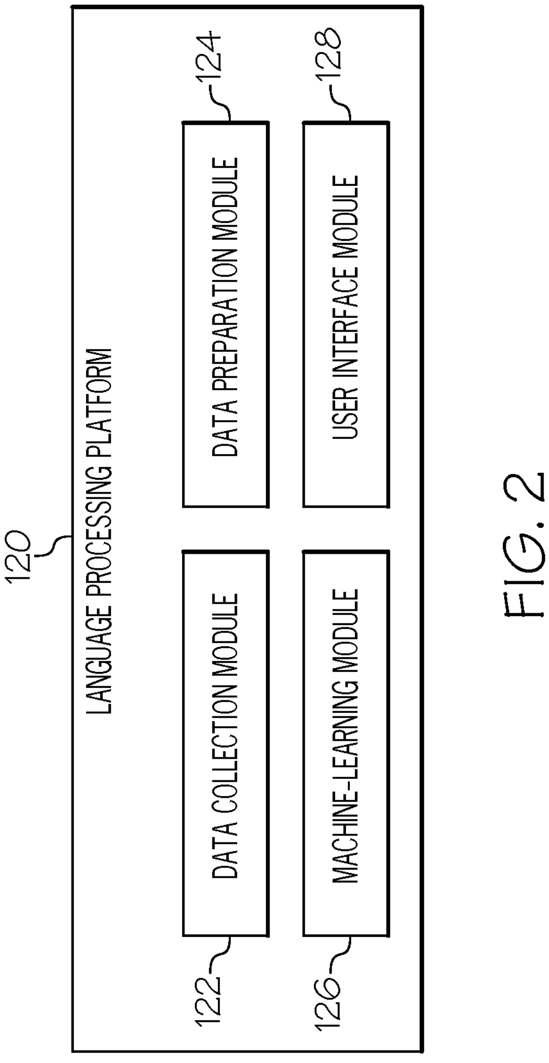
FIG. 2 is a diagram of example components of a language processing platform, according to some embodiments of the disclosure.

FIG. 2 is a diagram of example components of a language processing platform, according to some embodiments of the disclosure. Referring to FIG. 2, the language processing platform 120 is a component of the network environment 100. The language processing platform 120 provides the natural language processing capabilities necessary to analyze and extract information from the document corpus and/or one or more documents therein. As used herein, terms such as "component" or "module" generally encompass hardware and/or software, e.g., that a processor or the like is used to implement associated functionality. By way of example, the language processing platform 120 includes one or more components for predicting and/or detecting text. It is contemplated that the functions of these components are combined in one or more components or performed by other components of equivalent functionality. The language processing platform 120 includes one or more modules, such as a data collection module 122, a data preparation module 124, a machine-learning module 126, and a user interface module 128, or any combination thereof.

In one embodiment, the data collection module 122 collects relevant data, e.g., topic and/or text predication data, and the like, through various data collection techniques. In one embodiment, the data collection module 122 uses a web-crawling component to access various databases, e.g., the database 125, or other information sources, e.g., any third-party databases, to collect relevant data associated a document corpus 110. In one embodiment, the data collection module 122 includes various software applications, e.g., data mining applications in Extended Meta Language (XML), which automatically search for and return relevant data. The data collection module 122, in some embodiments, is responsible for in-taking one or more documents, or a document corpus, into the language processing platform 120. The data collection module 122 can be designed to work with various types of documents, such as text-based documents, images, audio, or video. The module can be designed to accept documents in various formats, such as plain text, PDF, HTML, XML, or other structured or unstructured data formats.

Once the documents have been collected, the data preparation module 124 processes the documents into a format which can be used as an input to one or more module, such as tokens that can be used as input to the natural language processing algorithms. The data preparation module 124 uses various techniques to tokenize the documents, such as breaking the text into individual words, removing stop words, converting the words to their base form (e.g., stemming), or otherwise transforming the text into a standardized encoding format which is suitable for processing by one or more model, such as a machine-learning model. The data preparation module 124 can also be responsible for identifying important entities within the documents, such as people, places, or organizations. In one example embodiment, the data preparation module 124 examines the collected data for any errors to eliminate bad data, e.g., redundant, incomplete, or incorrect data, to create high-quality data. In one example embodiment, collected data, e.g., raw data, is converted into a common format, e.g., machine readable form, that is easily processed by other modules and platforms.

The machine-learning module 126 is responsible for applying natural language processing techniques to the documents and generating insights and information from the text. The machine-learning module 126 can include various algorithms and techniques, such as sentiment analysis, named entity recognition, part-of-speech tagging, and topic modeling. The machine-learning module 126 also includes deep learning techniques, such as neural networks, to improve the accuracy and performance of the natural language processing algorithms.

In one embodiment, the machine-learning module 126 is configured for unsupervised machine-learning that does not require training using known outcomes. The unsupervised machine-learning utilizes machine-learning algorithms to analyze and cluster unlabeled datasets and discover hidden patterns or data groupings, e.g., similarities and differences within data, without supervision. In one example embodiment, the unsupervised machine-learning implements approaches that includes clustering (e.g., deep embedded clustering, K-means clustering, hierarchical clustering, and probabilistic clustering), association rules, classification, principal component analysis (PCA), or the like.

In one embodiment, the machine-learning module 126 is also configured for supervised machine-learning that utilizes training data, e.g., training data 912 illustrated in the training flow chart 900, for training a machine-learning model configured to predict and/or detect next words based on the relevant data. In one example embodiment, the machine-learning module 126 performs model training using training data, e.g., data from other modules that contains input and correct output, to allow the model to learn over time. The training is performed based on the deviation of a processed result from a documented result when the inputs are fed into the machine-learning model, e.g., an algorithm measures its accuracy through the loss function, adjusting until the error has been sufficiently minimized. In one embodiment, the machine-learning module 126 randomizes the ordering of the training data, visualizes the training data to identify relevant relationships between different variables, identifies any data imbalances, and splits the training data into two parts where one part is for training a model and the other part is for validating the trained model, de-duplicating, normalizing, correcting errors in the training data, and so on. The machine-learning module 126 implements various machine-learning techniques, e.g., K-nearest neighbors, cox proportional hazards model, decision tree learning, association rule learning, neural network (e.g., recurrent neural networks, graph convolutional neural networks, deep neural networks), inductive programming logic, support vector machines, Bayesian models, Gradient boosted machines (GBM), LightGBM (LGBM), Xtra tree classifier, etc.

In one embodiment, the machine-learning module 126 implements natural language processing (NLP) to analyze, understand, and derive meaning from the texts within document corpus 110 and/or documents 112. NLP is applied to analyze text, allowing machines to understand how humans speak/write, enabling real-world applications such as automatic text summarization, sentiment analysis, topic extraction, named entity recognition, parts-of-speech/text tagging, relationship extraction, stemming, and/or the like. In one embodiment, NLP generally encompasses techniques including, but not limited to, keyword search, finding relationships (e.g., synonyms, hypernyms, hyponyms, and meronyms), extracting information (e.g., keywords, key phrases, search terms), classifying, and determining positive/negative sentiment of documents.

The user interface module 128 provides a way for users to interact with the language processing platform 120, allowing them to configure and customize the natural language processing algorithms, and to view the results of the analysis. The user interface module 128 can include various features, such as search capabilities, data visualization tools, and customization options.

In one embodiment, the user interface module 128 enables a presentation of a graphical user interface (GUI) that facilitates text predictions visualization. The user interface module 128 employs various application programming interfaces (APIs) or other function calls corresponding to one or more application, thus enabling the display of graphics primitives such as icons, bar graphs, menus, buttons, data entry fields, etc. In another embodiment, the user interface module 128 causes interfacing of guidance information to include, at least in part, one or more annotations, audio messages, video messages, or a combination thereof pertaining to one or more notification. In another example embodiment, the user interface module 128 operates in connection with augmented reality (AR) processing techniques, wherein various applications, graphic elements, and features interact to present one or more notifications in a format that is understandable by the recipients, e.g., service providers.

In addition to the modules described above, the language processing platform 120 can also include various sub-modules, such as data preprocessing modules, feature extraction modules, and model selection modules. These sub-modules can be used to preprocess the data before it is passed to the machine-learning module 126, extract important features from the data, and select the most appropriate machine-learning model for the task at hand.

Figure 3:
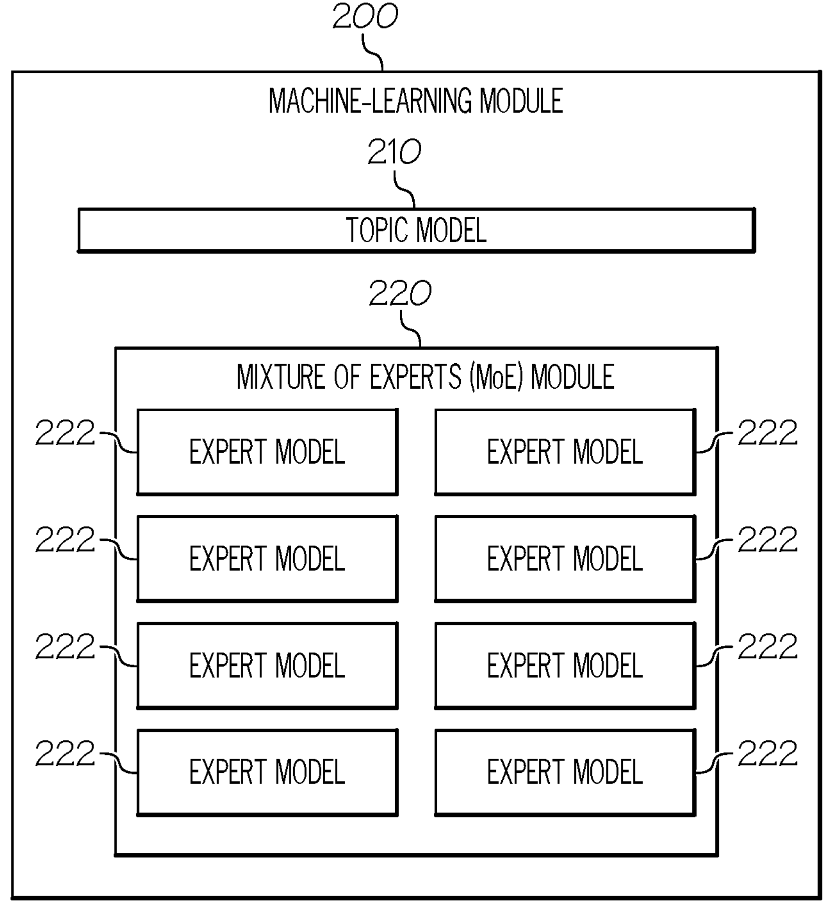
FIG. 3 is a diagram of example components of a machine-learning module, according to some embodiments of the disclosure.

FIG. 3 is a diagram of example components of a machine-learning module, according to some embodiments of the disclosure. Referring to FIG. 3, a machine-learning module 200 is shown. The machine-learning module 200 can be the same as the machine-learning module 126 shown in FIG. 2, or it can be a separate model. The machine-learning module 200 enables the ability to generate insights and information from the text contained within the document corpus, such as predicting a text output that is indicative of a next text string, an identifier, or the like. The machine-learning module 200 can include one or more models, such as a topic model 210 and one or more expert models 222, which in some embodiments form a Mixture-of-experts (MoE) module 220, which can be used to analyze the text and output one or more results based on the analysis, such as a text output. It will be appreciated that the machine-learning module 200 can include one or more additional models, as necessary, to fit the needs of the language processing platform 120.

The topic model 210 is a type of machine-learning model that is be designed and/or trained to identify one or more topics within a document or set of documents. The topic model 210 analyzes the content of the text and identifies recurring patterns of words or phrases that are associated with particular topics. These topics can be defined based on a set of predefined categories or can be generated automatically based on the content of the documents.

Once the topic model 210 has identified the topics within a document or corpus, the MoE module 220 can be used to analyze the text and extract more detailed information about each topic. Each of the expert models 222 without the MoE module can be designed to work with specific topics or can be designed to work with a wide range of topics, depending on the needs of the application. In a preferred embodiment, each expert model 222 has been trained to be associated with a particular topic.

For example, an expert model 222 associated with a particular topic is trained to identify entities, such as people, organizations, locations, and/or probable text outputs that are associated with that topic. This model uses various natural language processing techniques to identify patterns and/or associations within the text and provide an output related to the same, such as a predicted next word or string of words. Another expert model 222 can be trained to associate with a second particular topic, which in some embodiments is distinct from the first. Similarly, it will be appreciated that an nth expert model 222 is trained to associated with an nth particular topic, which may be distinct from the first and second topics, or more.

The expert models 222 can be trained separately from the topic model 210, or they can be trained together as part of a larger machine-learning pipeline. When trained together, the topic model 210 and expert models 222 can work together to generate more accurate and comprehensive insights and information from the text, such as identifying one or more topics and outputting a predicted missing text and/or a probability vector of missing text.

Figure 4:
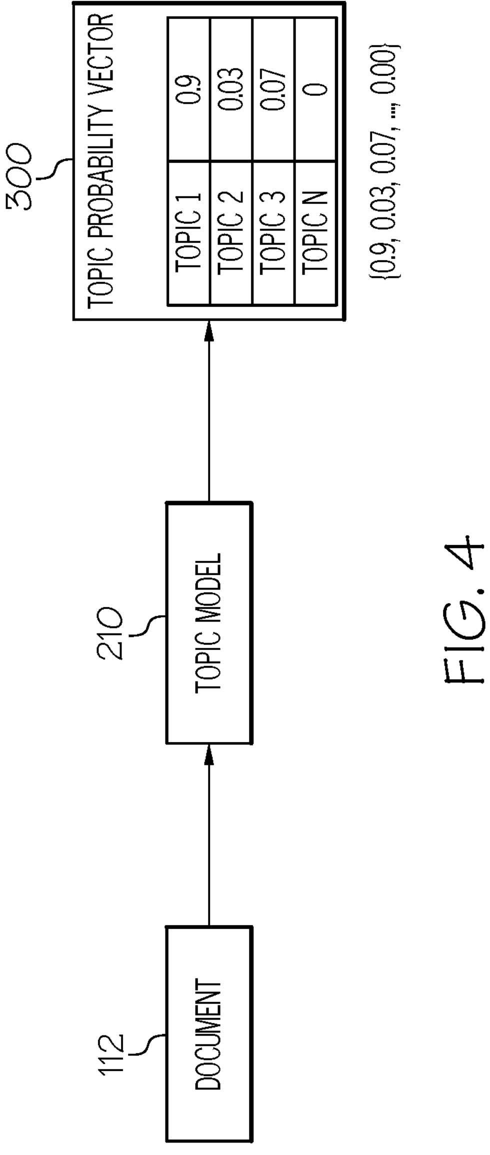
FIG. 4 is a flowchart of an example of a process for applying topic modeling to text prediction, according to some embodiments of the disclosure.

FIG. 4 is a flowchart of an example of a process for applying topic modeling to text prediction, according to some embodiments of the disclosure. Referring to FIG. 4, in the network environment 100, one or more documents 112 are applied to a topic model 210, which can output a topic probability vector 300. This probability vector represents the likelihood of each topic being present in the document or set of documents, based on the patterns and structures identified by the topic model.

The topic model 210 may use various natural language processing techniques to identify the topics within the document or set of documents. These techniques may analyze the patterns and structures in the text data and, in some embodiments, recognize and/or group together similar words or phrases, thereby creating a set of topics that represent the major themes and concepts present in the text.

Topic probability vector 300 may, in some embodiments, be a data structure that represents the likelihood of each topic being present in a document or set of documents. The structure of the topic probability vector can be a one-dimensional array or vector, with each element in the vector representing a specific topic and its associated probability.

The topic probability vector is generated by the topic model, which analyzes the patterns and structures in the text data and identifies the major themes and concepts present in the text. The topic model assigns a probability value to each topic, representing the likelihood of that topic being present in the text.

The structure of the topic probability vector is typically defined by the number of topics identified by the topic model. For example, if the topic model identifies five topics within the text, the topic probability vector will have five elements, each representing the probability of a specific topic being present in the text.

The values in the topic probability vector typically range between 0 and 1, with higher values indicating a higher likelihood of the corresponding topic being present in the text. The sum of all the probabilities in the vector is typically equal to 1, ensuring that the probabilities represent a valid probability distribution over the topics. However, in some embodiments, the sum of the probabilities may not equal 1, and as such the probabilities may be normalized such that they equal 1.

The structure of the topic probability vector can be customized based on the specific needs of the application. For example, the vector may include additional information, such as the standard deviation of each probability or the correlation between different topics.

While a one-dimensional array may be utilized in some embodiments, in some embodiments the topic probability vector can be represented as a two-dimensional array instead. In a two-dimensional array, each row of the array represents a document, and each column represents a specific topic. The value in each element of the array represents the probability of the corresponding topic being present in the corresponding document. This structure can be useful when working with a large set of documents and multiple topics.

Once the topic model 210 has generated the topic probability vector 300, a topic identifier can be applied to the document or set of documents. The topic identifier works by examining the probability vector and identifying the topics with the highest probability of being present in the text. If multiple topics are identified, they can be applied to the document or set of documents as a set of one or more topics.

The application of the one or more topics to the document or set of documents can be based on a pre-defined threshold for each topic. For example, if the probability associated with a topic exceeds a pre-defined threshold, the topic can be considered to be present in the document or set of documents. This threshold can be set based on the needs of the application and varies depending on the specific topic of interest. The application of the one or more topics can require all topics to pass a certain threshold, only select topics to pass a certain threshold, or for no topics to surpass a certain threshold, depending on the needs of the user.

Once one or more topics have been identified and applied to the document or set of documents 112, they can be used to apply the document 112 to one or more expert models 400. The expert models 400 are designed and/or trained to identify specific patterns and structures within the text data associated with the particular topics of interest.

Figure 5:
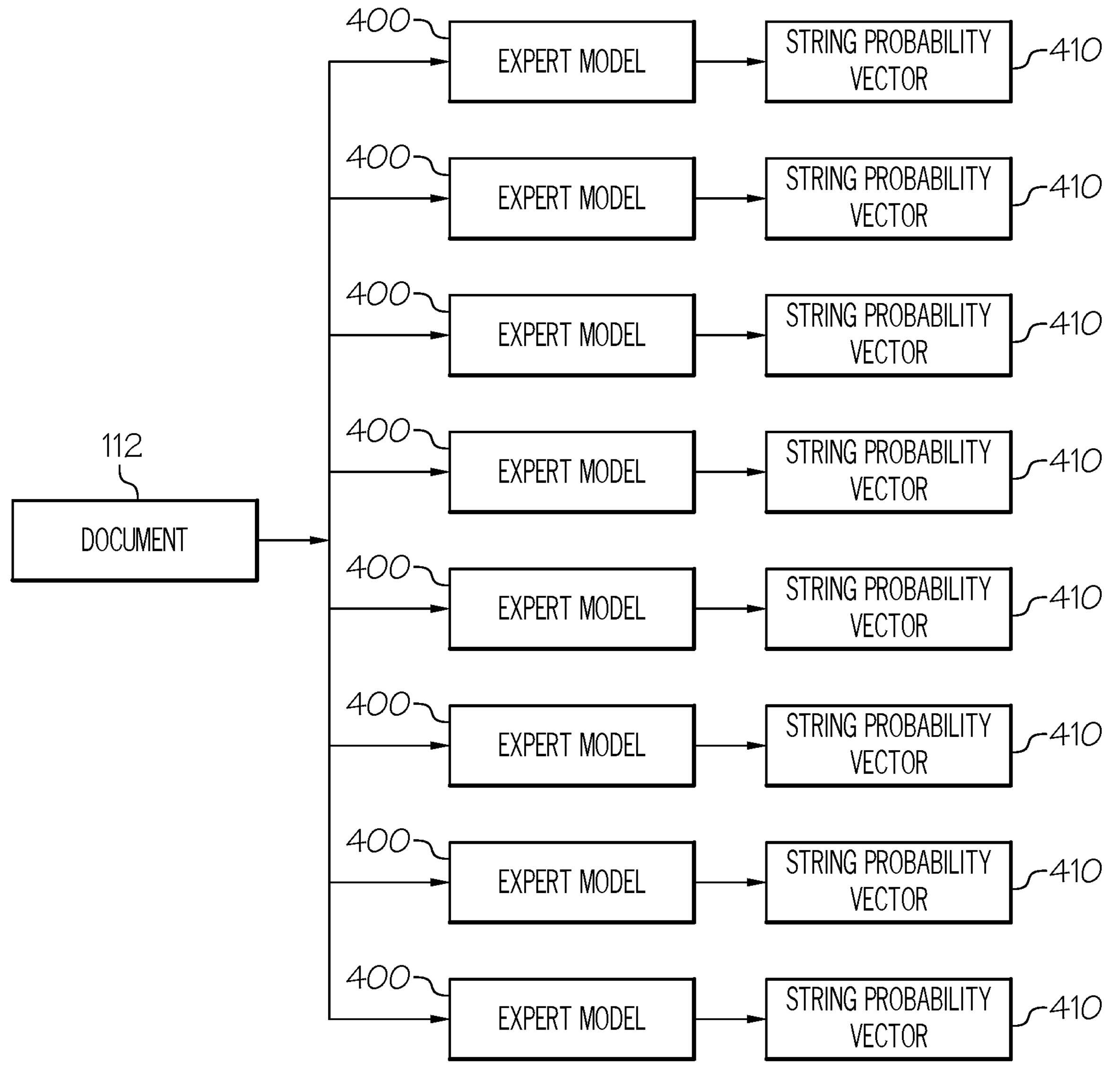
FIG. 5 is a diagram showing an example of a process for applying one or more expert models to text prediction, according to some embodiments of the disclosure.

FIG. 5 is a diagram showing an example of a process for applying one or more expert models to text prediction, according to some embodiments of the disclosure. Referring to FIG. 5, one or more documents 112 are applied to one or more expert models 400. The document 112 can be applied to all expert models 400, or the document 112 can be applied to only those expert models 400 which are associated with one or more topics that have been applied to the document 112. Each expert model 400 independently intakes each document 112 and generates a string probability vector 410.

The expert models 400 are designed to identify patterns and structures within the text data that are associated with the specific topics of interest. Each expert model 400 can be trained using supervised learning techniques, where the model is trained on a labeled dataset that includes examples of text data and their associated patterns or structures of interest. The model learns to identify these patterns and structures and uses them to make predictions about the text data.

Once the expert model 400 has been trained, it can be used to apply the document 112 to identify the specific patterns and structures associated with the particular topics of interest, and to identify probabilities associated with predicted text strings. The expert model 400 intakes the document 112, processes it using natural language processing techniques, and generates a string probability vector 410. This vector represents the likelihood of the identified patterns or structures being associated with the text data, such as a probability of a certain text string, which may be the next or missing string of text within the document.

The structure of the string probability vector 410 can vary depending on the specific application and the type of expert model 400 used. For example, the vector can be a one-dimensional array where each element represents the probability of a particular string or word being associated with the text data. Alternatively, the vector can be a two-dimensional array where each row represents a document and each column represents the probability of a particular string or word being associated with the text data of that particular document.

The output of the expert models 400 can be used to generate insights and information about the text data associated with the particular topics of interest. For example, an expert model 400 associated with a particular topic is used to identify probabilities associated with one or more text string based on the training and associations with that topic. The string probability vector 410 generated by the expert model 400 can be used to rank the identified patterns or structures in order of their likelihood, with the most likely patterns or structures at the top of the list.

Figure 6:
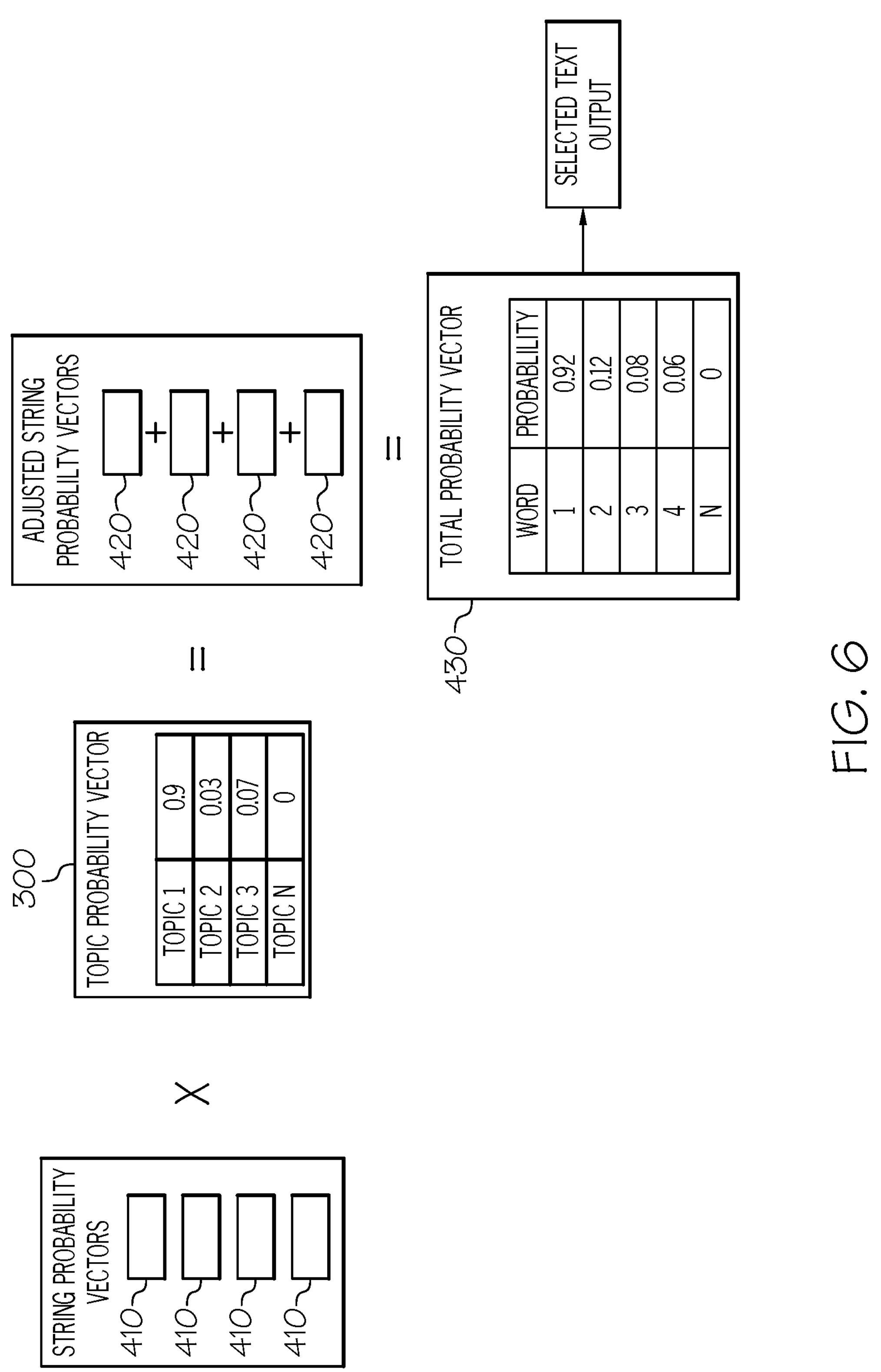
FIG. 6 is a diagram showing an example process for applying one or more adjustments and/or calculations to one or more probability vectors to text prediction, according to some embodiments of the disclosure.

FIG. 6 is a diagram showing an example process for applying one or more adjustments and/or calculations to one or more probability vectors to text prediction, according to some embodiments of the disclosure. Referring to FIG. 6, the string probability vectors 410 which are output from each expert model 400 are then augmented or otherwise utilized as part of a further determination of probability associated with one or more text strings, patterns, or structures associated with one or more documents. In some embodiments, one or more transformations are performed to each string probability vector 410, which may produce one or more adjusted string probability vectors 420 and/or a total probability vector 430. The transformation can be in the form of one or more calculations. The calculation can be a single step calculation, or a multi-step calculation. The result of the calculation can be, in some embodiments, a vector which represents cumulative or total probabilities, such as total probability vector 430.

In some embodiments, a first step of the transformation is adjusting and/or multiplying each string probability vector 410 by a first modifier. In some embodiments, the first modifier is a probability associated with the respective topic for each string probability vector 410, which can be derived from the associated entry within the topic probability vector

300. Each respective string probability vector can be multiplied by the topic probability associated with the same topic as is associated with the respective string probability vector. For example, if the topic probability for a first topic is 0.1, then the resulting string probability vector associated with the topic is multiplied by 0.1. Continuing this example, if the unadjusted string probability vector is (0.9, 0.03, 0.07 . . . 0.00) then the resulting adjusted string probability vector is (0.09, 0.003, 0.007 . . . 0.00). This can be performed for each string probability vector 410, resulting in one or more adjusted string probability vectors 420. Each adjusted string probability vector can include values which represent the values of the unadjusted string probability vector multiplied by a topic probability. It will be appreciated that in some embodiments, one or more of the string probability vectors may not be adjusted, such that only certain select string probability vectors are transformed from an unadjusted to an adjusted state. The selection of which string probability vectors are adjusted can be based on thresholds or other selective criteria as discussed throughout this disclosure.

Once one or more adjusted string probability vectors have been generated, one or more adjusted string probability vectors are further transformed to produce a total probability vector 430. In some embodiments, each string probability vector (and therefore each adjusted string probability vector) includes the same number of value entries, thus enabling the adjusted string probability vectors to be added to one another. In some embodiments, each value (index) within each vector represents the probability (or adjusted probability) of one or more strings, words, phrases, or the like. The various string probability vectors can include indexes where similarly positioned values in the index of a first string probability vector and a second string probability vector represent the same one or more strings, words, phrases, or the like within each string probability vector. This structure can allow for two or more vectors to be added to each other, where the resulting vector includes values which represent the cumulative or total probability associated with one or more strings, words, phrases, or the like. In some embodiments, all resulting adjusted string probability vectors are summed together, thereby producing a total probability vector. The total probability vector includes the same number of indices as each of the adjusted string probability vectors, with the value in each index representing the total probability associated with one or more strings, words, phrases, or the like. By comparing all of the values of the total probability vector, one or more strings, words, phrases, or the like are identified as the output with the highest likelihood of occurrence, and may be selected and/or output.

Figure 7:
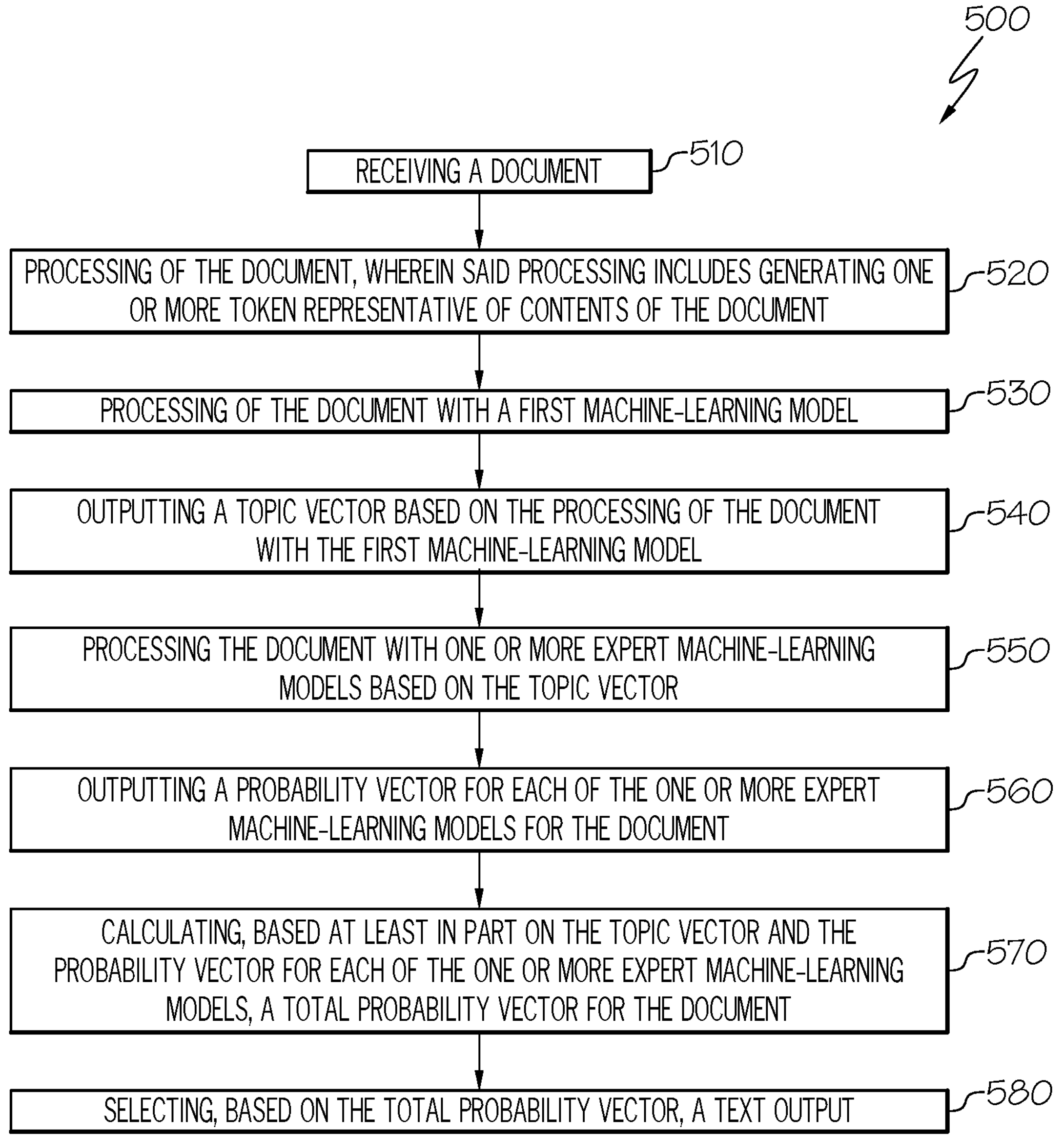
FIG. 7 is a flowchart showing a method for predicting next text, according to some embodiments of the disclosure.

FIG. 7 is a flowchart showing a method for predicting next text, according to some embodiments of the disclosure. Referring to FIG. 7, a flowchart is depicted. The flowchart may depict one or more steps to a computer-implemented method 500 of predicting missing text. The computer-implemented method, at any given step, can be carried out by one or more processors, which can be connected to a memory. Notably, method 500 may be performed by the language processing platform 120, or the one or more modules therein (e.g., data collection module 122, data preparation module 124, machine-learning module 126, user interface module 128).

At step 510, the method may include receiving a document. The document may be a document, a plurality of documents, or a corpus of documents as discussed herein, such as document corpus 110 and/or documents 112. At step 520, the document are processed and/or tokenized, the processing and/or tokenization generating one or more token which is representative of contents of the document. The token can be a string, character, or alphanumeric representation of one or more aspects of the document which is suitable for intake by a machine-learning model. At step 530, the method can include processing the document with a first machine-learning model. The processing of the document with a first machine-learning model can include intaking one or more tokens associated with the document and outputting a first output. The first machine-learning model can be a topic model which is trained to associate a document and/or a corpus of documents with one or more topics and/or probabilities of the document being related to one or more topic. At step 540, the method includes outputting a topic vector, which can include probabilities of the document and/or corpus of documents being associated with one or more topic. The method can further include assigning to the document and/or document corpus a topic identifier, which includes one or more topics. The topics selected for inclusion in the topic identifier can be determined by comparing the first output, such as a topic vector, or one or more items within the first output, such as a particular value in the vector, against a pre-defined threshold for each topic. This comparison can be made for each topic and each associated topic probability within the topic vector, where only topics that exceed the pre-defined probability threshold for the topic are included in the topic identifier. At step 550, the method includes processing the document and/or document corpus with one or more expert machine-learning models, such as discussed throughout this disclosure. Each expert machine-learning model can be associated with a different topic. At step 560, the method includes outputting a probability vector for each expert machine-learning model. The probability vector can represent and/or include numerical probabilities for a string, work, phrase, or the like being a next text associated with the document. The probabilities within the vector can be associated with a vocabulary or listing of words, which can be a list of works that the overall method has to choose from. For example, the vocabulary comprises 50,000 words (or other total number of words), each word having a probability value contained within the probability vector. Each applied expert machine-learning model will output such a probability vector, with each probability vector, in some embodiments, being based on the same vocabulary or list of words. At step 570, the method includes calculating a total probability vector, with the calculation being based at least on the topic vector and one or more of the probability vectors. The calculation can be and/or may include a generation and/or a transformation of one or more pieces of data as described elsewhere herein, and the output of the generation, transformation, and/or calculation can be a total probability vector as discussed herein. At step 580, the method further includes selecting a text output based on the total probability vector. For example, the method includes selecting the word or phrase which has the highest probability value within the total probability vector.

As described herein, an application of a document to one or more expert models is considered. This application can be referred to as an allocation of the document, or an assignment of the document. In some embodiments, there are two types of allocations that can be used for each topic: a hard allocation and a soft allocation. A hard allocation occurs when a topic is indicated as having the highest probability, and the inputs are passed only to the single model that is associated with that topic. In contrast, a soft allocation occurs when the inputs are passed to all models associated with topics that pass a certain probability threshold.

The decision of whether to use a hard or a soft allocation can be dynamically determined based on the output of the topic model. Specifically, if the probability of a single topic is significantly higher than the other topics, a hard allocation can be used, as it is likely that the text data is primarily associated with that topic. Conversely, if the probabilities of the different topics are relatively close, a soft allocation may be more appropriate, as it allows for a more comprehensive analysis of the text data. Alternatively, the decision may be based on the topic itself, where if a certain topic is indicated as the most probable topic, then a hard allocation is used regardless of how close the probabilities of other topics are. This can be true for a single topic, multiple topics, or all topics.

The system can optimize the use of both hard and soft allocation dynamically by using a threshold value to determine which allocations are appropriate for each topic. The threshold value can be set based on the characteristics of the text data and the specific goals of the analysis. For example, a higher threshold value is appropriate for allocations where precision is more important, while a lower threshold value is appropriate for applications where recall is more important.

In addition to dynamically determining whether to use a hard or soft assignment for each topic, the system can also be configured to always use a hard assignment or always use a soft assignment, depending on the specific requirements of the application.

The use of both hard and soft assignments allows for a more nuanced analysis of the text data and can improve the accuracy and efficiency of the overall system. By dynamically determining whether to use a hard or a soft assignment for each topic, the system can adapt to the specific characteristics of the text data and optimize the analysis process for the specific application.

Figure 8:
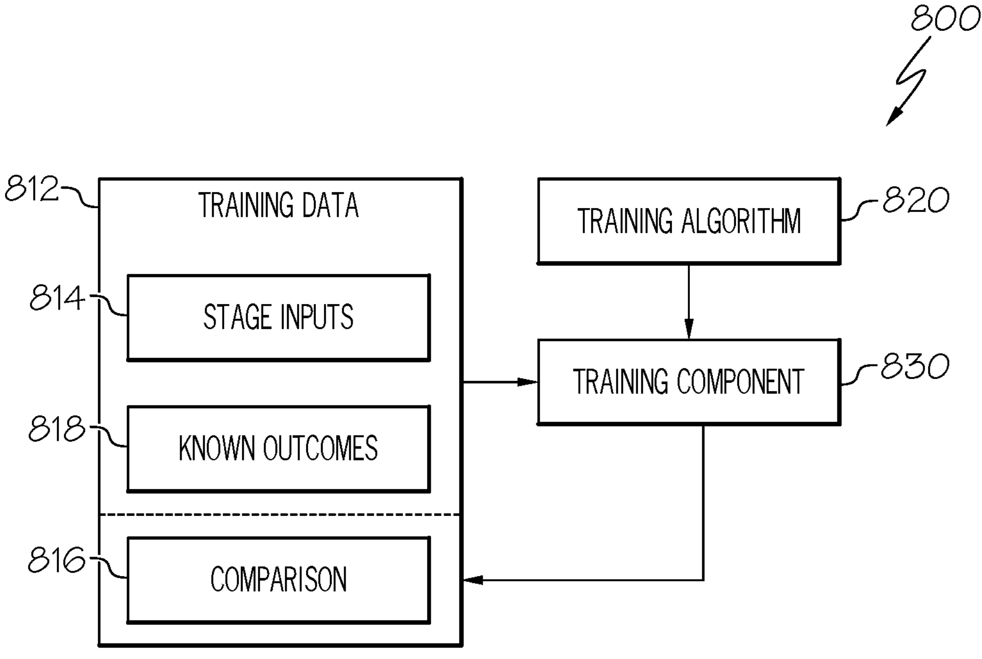
FIG. 8 shows an example machine-learning training flow chart, according to some embodiments of the disclosure.

One or more implementations disclosed herein include and/or are implemented using a machine-learning model, e.g., the topic model and one or more expert model. For example, one or more of the modules of the prediction platform are implemented using a machine-learning model and/or are used to train the machine-learning model. FIG. 8 shows an example machine-learning training flow chart, according to some embodiments of the disclosure. Referring to FIG. 8, a given machine-learning model is trained using the training flow chart 800. The training data 812 includes one or more of stage inputs 814 and the known outcomes 818 related to the machine-learning model to be trained. The stage inputs 814 are from any applicable source including text, visual representations, data, values, comparisons, and stage outputs, e.g., one or more outputs from one or more steps from FIG. 7. The known outcomes 818 are included for the machine-learning models generated based on supervised or semi-supervised training, or can based on known labels, such as topic labels. An unsupervised machine-learning model is not trained using the known outcomes 818. The known outcomes 818 includes known or desired outputs for future inputs similar to or in the same category as the stage inputs 814 that do not have corresponding known outputs.

The training data 812 and a training algorithm 820, e.g., one or more of the modules implemented using the machine-learning model and/or are used to train the machine-learning model, is provided to a training component 830 that applies the training data 812 to the training algorithm 820 to generate the machine-learning model. According to an implementation, the training component 830 is provided comparison results 816 that compare a previous output of the corresponding machine-learning model to apply the previous result to re-train the machine-learning model. The comparison results 816 are used by the training component 830 to update the corresponding machine-learning model. The training algorithm 820 utilizes machine-learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, the model specifically discussed herein, or the like.

The machine-learning model used herein is trained and/or used by adjusting one or more weights and/or one or more layers of the machine-learning model. For example, during training, a given weight is adjusted (e.g., increased, decreased, removed) based on training data or input data. Similarly, a layer is updated, added, or removed based on training data/and or input data. The resulting outputs are adjusted based on the adjusted weights and/or layers.

In general, any process or operation discussed in this disclosure is understood to be computer-implementable, such as the process illustrated in FIGS. 2-8 are performed by one or more processors of a computer system as described herein. A process or process step performed by one or more processors is also referred to as an operation. The one or more processors are configured to perform such processes by having access to instructions (e.g., software or computer-readable code) that, when executed by one or more processors, cause one or more processors to perform the processes. The instructions are stored in a memory of the computer system. A processor is a central processing unit (CPU), a graphics processing unit (GPU), or any suitable type of processing unit.

A computer system, such as a system or device implementing a process or operation in the examples above, includes one or more computing devices. One or more processors of a computer system are included in a single computing device or distributed among a plurality of computing devices. One or more processors of a computer system are connected to a data storage device. A memory of the computer system includes the respective memory of each computing device of the plurality of computing devices.

Figure 9:
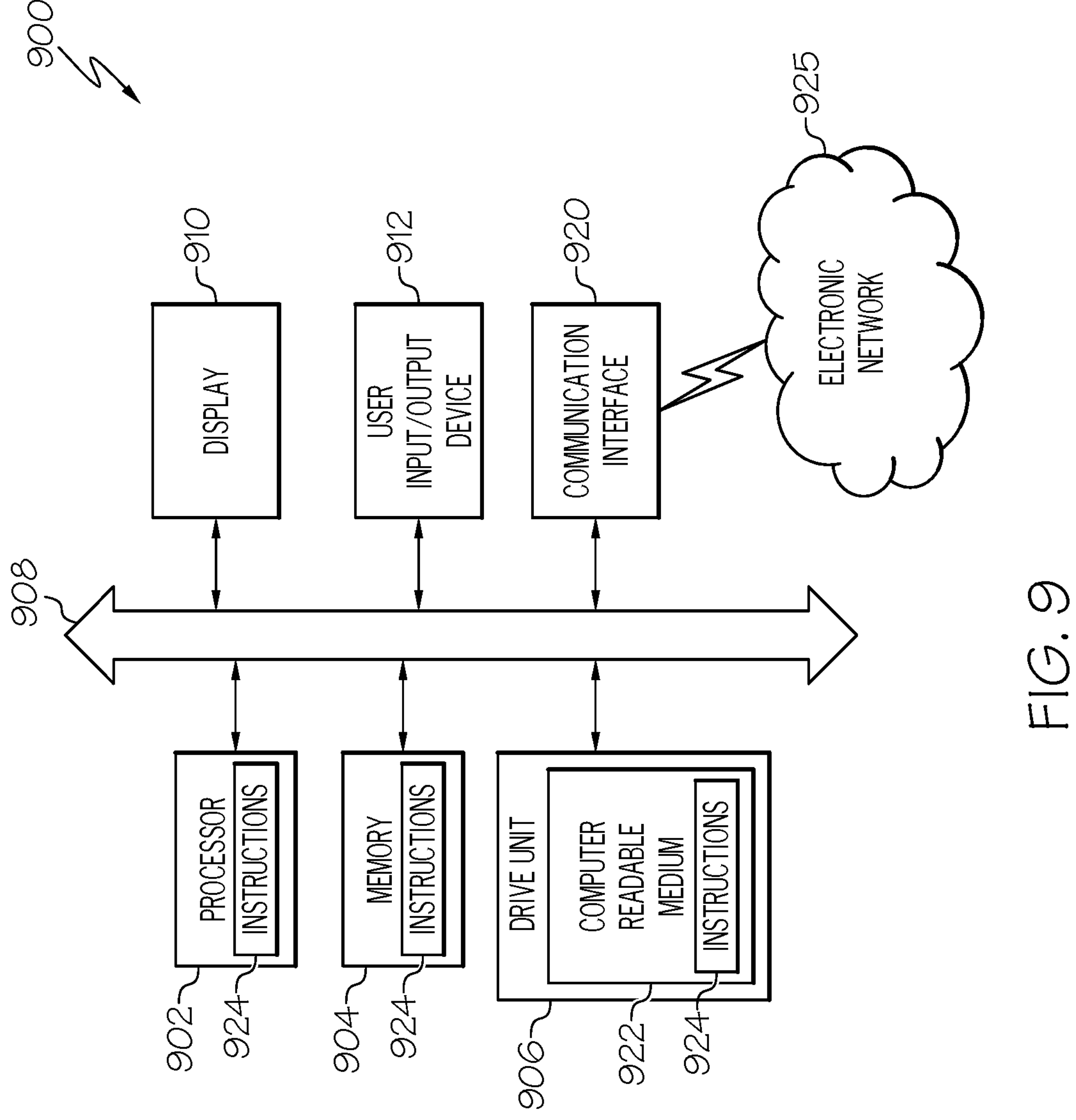
FIG. 9 illustrates an implementation of a computer system that executes techniques presented herein, according to some embodiments of the disclosure.

FIG. 9 illustrates an implementation of a computer system that executes techniques presented herein. The computer system 900 includes a set of instructions that are executed to cause the computer system 900 to perform any one or more of the methods or computer based functions disclosed herein. The computer system 900 operates as a standalone device or is connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 900 operates in the capacity of a server or as a client user computer in a server-client user network environment, or as a peer computer system in a peer-to-peer (or distributed) network environment. The computer system 900 is also implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 900 is implemented using electronic devices that provide voice, video, or data communication. Further, while the computer system 900 is illustrated as a single system, the term "system" shall also be taken to include any collection of systems or sub-systems that individually or jointly execute a set, or multiple sets, of instructions to perform one or more computer functions.

As illustrated in FIG. 9, the computer system 900 includes a processor 902, e.g., a central processing unit (CPU), a graphics processing unit (GPU), or both. The processor 902 is a component in a variety of systems. For example, the processor 902 is part of a standard personal computer or a workstation. The processor 902 is one or more processors, digital signal processors, application specific integrated circuits, field programmable gate arrays, servers, networks, digital circuits, analog circuits, combinations thereof, or other now known or later developed devices for analyzing and processing data. The processor 902 implements a software program, such as code generated manually (i.e., programmed).

The computer system 900 includes a memory 904 that communicates via bus 908. The memory 904 is a main memory, a static memory, or a dynamic memory. The memory 904 includes, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 904 includes a cache or random-access memory for the processor 902. In alternative implementations, the memory 904 is separate from the processor 902, such as a cache memory of a processor, the system memory, or other memory. The memory 904 is an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts, or tasks illustrated in the figures or described herein are performed by the processor 902 executing the instructions stored in the memory 904. The functions, acts, or tasks are independent of the particular type of instruction set, storage media, processor, or processing strategy and are performed by software, hardware, integrated circuits, firmware, micro-code, and the like, operating alone or in combination. Likewise, processing strategies include multiprocessing, multitasking, parallel processing, and the like.

As shown, the computer system 900 further includes a display 910, such as a liquid crystal display (LCD), an organic light emitting diode (OLED), a flat panel display, a solid-state display, a cathode ray tube (CRT), a projector, a printer or other now known or later developed display device for outputting determined information. The display 910 acts as an interface for the user to see the functioning of the processor 902, or specifically as an interface with the software stored in the memory 904 or in the drive unit 906.

Additionally or alternatively, the computer system 900 includes an input/output device 912 configured to allow a user to interact with any of the components of the computer system 900. The input/output device 912 is a number pad, a keyboard, a cursor control device, such as a mouse, a joystick, touch screen display, remote control, or any other device operative to interact with the computer system 900.

The computer system 900 also includes the drive unit 906 implemented as a disk or optical drive. The drive unit 906 includes a computer-readable medium 922 in which one or more sets of instructions 924, e.g. software, is embedded. Further, the sets of instructions 924 embodies one or more of the methods or logic as described herein. The sets of instructions 924 resides completely or partially within the memory 904 and/or within the processor 902 during execution by the computer system 900. The memory 904 and the processor 902 also include computer-readable media as discussed above.

In some systems, computer-readable medium 922 includes the set of instructions 924 or receives and executes the set of instructions 924 responsive to a propagated signal so that a device connected to network 930 communicates voice, video, audio, images, or any other data over the network 930. Further, the sets of instructions 924 are transmitted or received over the network 930 via the communication port or interface 920, and/or using the bus 908. The communication port or interface 920 is a part of the processor 902 or is a separate component. The communication port or interface 920 is created in software or is a physical connection in hardware. The communication port or interface 920 is configured to connect with the network 930, external media, the display 910, or any other components in the computer system 900, or combinations thereof. The connection with the network 930 is a physical connection, such as a wired Ethernet connection, or is established wirelessly as discussed below. Likewise, the additional connections with other components of the computer system 900 are physical connections or are established wirelessly. The network 930 alternatively be directly connected to the bus 908.

While the computer-readable medium 922 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that causes a computer system to perform any one or more of the methods or operations disclosed herein. The computer-readable medium 922 is non-transitory, and may be tangible.

The computer-readable medium 922 includes a solid-state memory such as a memory card or other package that houses one or more non-volatile read-only memories. The computer-readable medium 922 is a random-access memory or other volatile re-writable memory. Additionally or alternatively, the computer-readable medium 922 includes a magneto-optical or optical medium, such as a disk or tapes or other storage device to capture carrier wave signals such as a signal communicated over a transmission medium. A digital file attachment to an e-mail or other self-contained information archive or set of archives is considered a distribution medium that is a tangible storage medium. Accordingly, the disclosure is considered to include any one or more of a computer-readable medium or a distribution medium and other equivalents and successor media, in which data or instructions are stored.

In an alternative implementation, dedicated hardware implementations, such as application specific integrated circuits, programmable logic arrays, and other hardware devices, is constructed to implement one or more of the methods described herein. Applications that include the apparatus and systems of various implementations broadly include a variety of electronic and computer systems. One or more implementations described herein implement functions using two or more specific interconnected hardware modules or devices with related control and data signals that are communicated between and through the modules, or as portions of an application-specific integrated circuit. Accordingly, the present system encompasses software, firmware, and hardware implementations.

Computer system 900 is connected to the network 930. The network 930 defines one or more networks including wired or wireless networks. The wireless network is a cellular telephone network, an 802.10, 802.16, 802.20, or WiMAX network. Further, such networks include a public network, such as the Internet, a private network, such as an intranet, or combinations thereof, and utilizes a variety of networking protocols now available or later developed including, but not limited to TCP/IP based networking protocols. The network 930 includes wide area networks (WAN), such as the Internet, local area networks (LAN), campus area networks, metropolitan area networks, a direct connection such as through a Universal Serial Bus (USB) port, or any other networks that allows for data communication. The network 930 is configured to couple one computing device to another computing device to enable communication of data between the devices. The network 930 is generally enabled to employ any form of machine-readable media for communicating information from one device to another. The network 930 includes communication methods by which information travels between computing devices. The network 930 is divided into sub-networks. The sub-networks allow access to all of the other components connected thereto or the sub-networks restrict access between the components. The network 930 is regarded as a public or private network connection and includes, for example, a virtual private network or an encryption or other security mechanism employed over the public Internet, or the like.

In accordance with various implementations of the present disclosure, the methods described herein are implemented by software programs executable by a computer system. Further, in an example, non-limited implementation, implementations can include distributed processing, component/object distributed processing, and parallel processing. Alternatively, virtual computer system processing can be constructed to implement one or more of the methods or functionality as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure is implemented using any appropriate techniques for implementing the functionality described herein. The disclosure is not limited to any particular programming language or operating system.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention are practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications are made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The present disclosure furthermore relates to the following aspects.

Example 1. A computer-implemented method for predicting missing text, the method comprising: receiving, by one or more processors, a document; processing, by the one or more processors, the document, wherein the processing includes generating one or more tokens representative of contents of the document; processing, by the one or more processors, the document with a first machine-learning model; outputting, by the one or more processors, a topic vector based on the processing of the document with the first machine-learning model; processing, by the one or more processors, the document with one or more expert machine-learning models based on the topic vector; outputting, by the one or more processors, a string probability vector for each of the one or more expert machine-learning models for the document; calculating, by the one or more processors, based at least in part on the topic vector and the string probability vector for each of the one or more expert machine-learning models, a total probability vector for the document; and selecting, by the one or more processors, based on the total probability vector, a text output.

Example 2. The computer-implemented method of Example 1, wherein the first machine-learning model is a topic model, the topic model trained to associate a document with a probability of the document being related to one or more topics.

Example 3. The computer-implemented method of any of the preceding Examples, wherein the topic vector comprises a plurality of probabilities, each probability associated with a topic.

Example 4. The computer-implemented method of Example 3, further comprising: comparing, by the one or more processors, each probability associated with a topic against a pre-defined probability threshold for each topic; determining, by the one or more processors, for each topic, if the probability associated with the topic exceeds the pre-defined probability threshold for the topic; and assigning, by the one or more processors, to the document a topic identifier, the topic identifier including each topic for which the probability associated with the topic exceeds the pre-defined probability threshold for the topic.

Example 5. The computer-implemented method of Example 4, wherein the processing of the document with the one or more expert machine-learning models based on the topic vector limits the processing of the document to only expert machine-learning models associated with topics that are present in a topic identifier of the document.

Example 6. The computer-implemented method of Example 3, wherein each of the one or more expert machine-learning models is associated with a different topic.

Example 7. The computer-implemented method of Example 6, wherein each of the one or more expert machine-learning models is trained relative to a single topic, such that each expert machine-learning model intakes tokens associated with the single topic and outputs a probability of an output text based on each relative topic.

Example 8. The computer-implemented method of any of the preceding Examples, wherein the calculation includes: multiplying, by the one or more processors, for each string probability vector for each of the one or more expert machine-learning models, each value within the vector against an associated topic probability within the topic vector, thereby generating an adjusted string probability vector for each of the one or more expert-machine-learning models; and summing, by the one or more processors, all adjusted string probability vectors, thereby producing a total probability vector.

Example 9. The computer-implemented method of Example 8, wherein the selecting based on the total probability vector involves identifying, by the one or more processors, a highest value within the total probability vector.

Example 10. A system for predicting missing text, the system comprising: a memory storing instructions; and a processor executing the instructions to perform a process including: receiving a document; processing the document, wherein the processing includes generating one or more token representative of contents of the document; processing the document with a first machine-learning model; outputting a topic vector based on the processing of the document with the first machine-learning model; processing the document with one or more expert machine-learning models based on the topic vector; outputting a string probability vector for each of the one or more expert machine-learning models for the document; calculating, based at least in part on the topic vector and the string probability vector for each of the one or more expert machine-learning models, a total probability vector for the document; and selecting based on the total probability vector, a text output.

Example 11. The system of Example 10, wherein the first machine-learning model is a topic model, the topic model trained to associate a document with a probability of the document being related to one or more topic.

Example 12. The system of any of Examples 10 or 11, wherein the topic vector comprises a plurality of probabilities, each probability associated with a topic.

Example 13. The system of Example 12, further comprising: comparing each probability associated with a topic against a pre-defined probability threshold for each topic; determining, for each topic, if the probability associated with the topic exceeds the pre-defined probability threshold for the topic; and assigning to the document a topic identifier, the topic identifier including each topic for which the probability associated with the topic exceeds the pre-defined probability threshold for the topic.

Example 14. The system of Example 13, wherein the processing of the document with one or more expert machine-learning models based on the topic vector limits the processing of the document to only expert machine-learning models associated with topics that are present in a topic identifier of the document.

Example 15. The system of Example 12, wherein each of the one or more expert machine-learning models is associated with a different topic.

Example 16. The system of Example 15, wherein each of the one or more expert machine-learning models is trained relative to a single topic, such that each expert machine-learning model intakes tokens associated with the single topic and outputs a probability of an output text based on each relative topic.

Example 17. The system of any of Examples 10, 11, 12, 13, 14, 15, or 16, wherein the calculation includes: multiplying, for each of the string probability vector for each one or more expert machine-learning models, each value within the vector against an associated topic probability within the topic vector, thereby generating an adjusted string probability vector for each of the one or more expert machine-learning models; and summing all adjusted string probability vectors, thereby producing a total probability vector.

Example 18. The system of Example 17, wherein the selecting based on the total probability vector involves identifying a highest value within the total probability vector.

Example 19. A computer-implemented method of generating a probability distribution, the method comprising: receiving, by one or more processors, a data set; processing, by the one or more processors, the data set to generate one or more tokens representative of contents of the data set; processing, by the one or more processors, the data set with a topic model to output a topic vector comprising a plurality of probabilities, each probability associated with a topic; comparing, by the one or more processors, each probability associated with a topic against a pre-defined probability threshold for each topic; determining, by the one or more processors, for each topic, if the probability associated with the topic exceeds the pre-defined probability threshold for the topic; assigning, by the one or more processors, to the data set a topic identifier, the topic identifier including each topic for which the probability associated with the topic exceeds the pre-defined probability threshold for the topic; processing, by the one or more processors, the data set with one or more expert machine-learning models, wherein each of the expert machine-learning models is associated with a different topic; outputting, by the one or more processors, a string probability vector for each of the one or more expert machine-learning models for the data set; calculating, by the one or more processors, a total probability vector for the data set by multiplying each value within the string probability vector against an associated topic probability within the topic vector for each of the expert machine-learning models, and summing all of the adjusted string probability vectors; and selecting, by the one or more processors, a text output based on the total probability vector.

Example 20. The computer-implemented method of Example 19, wherein the topic model and the one or more expert machine-learning models are trained at a same time, resulting a single model with layers representative of the topic model and the one or more expert machine-learning models as sub-models.

What is claimed is:

1. A computer-implemented method for predicting missing text, the method comprising:

receiving, by one or more processors, a document containing the missing text;

tokenizing, by the one or more processors, the document to generate one or more tokens representative of contents of the document;

applying, by the one or more processors, a first machine-learning model to the tokenized document to generate a topic vector, the first machine-learning model trained to analyze the one or more tokens and identify recurring patterns of words or phrases indicative of one or more topics within the document, and generate the topic vector based on the one or more topics;

outputting, by the one or more processors, the topic vector based on the applying of the first machine-learning model to the tokenized document;

processing, by the one or more processors, the tokenized document with each of one or more expert machine-learning models, which are different from the first machine-learning model, to generate a string probability vector, each of the one or more expert machine-learning models associated with a corresponding topic among the one or more topics and trained to identify entities and probable text outputs associated with the corresponding topic included in the topic vector;

outputting, by the one or more processors, the string probability vector for each of the one or more expert machine-learning models for the document;

calculating, by the one or more processors, based at least in part on the topic vector and the string probability vector for each of the one or more expert machine-learning models, a total probability vector comprising one or more probable text outputs for the document, wherein the calculating includes:

(i) multiplying, by the one or more processors, for the string probability vector for each of the one or more expert machine-learning models, each value within the string probability vector by an associated topic probability within the topic vector, thereby generating an adjusted string probability vector for each of the one or more expert machine-learning models; and (ii) summing, by the one or more processors, one or more adjusted string probability vectors generated for the one or more expert machine-learning models, thereby generating the total probability vector; and selecting, by the one or more processors, based on the total probability vector, a text output among the one or more probable text outputs to complete the missing text in the document.

2. The computer-implemented method of claim 1, wherein the first machine-learning model is a topic model, the topic model trained to associate a document with a probability of the document being related to one or more topics.

3. The computer-implemented method of claim 1, wherein the topic vector comprises a plurality of probabilities, each probability associated with a topic.

4. The computer-implemented method of claim 3, further comprising:

comparing, by the one or more processors, each probability associated with a topic against a pre-defined probability threshold for each topic;

determining, by the one or more processors, for each topic, if the probability associated with the topic exceeds the pre-defined probability threshold for the topic; and assigning, by the one or more processors, to the tokenized document a topic identifier, the topic identifier including each topic for which the probability associated with the topic exceeds the pre-defined probability threshold for the topic.

5. The computer-implemented method of claim 4, wherein the processing of the tokenized document with the one or more expert machine-learning models based on the topic vector limits the processing of the tokenized document to only expert machine-learning models associated with topics that are present in a topic identifier of the tokenized document.

6. The computer-implemented method of claim 3, wherein each of the one or more expert machine-learning models is associated with a different topic.

7. The computer-implemented method of claim 6, wherein each of the one or more expert machine-learning models is trained relative to a single topic, such that each expert machine-learning model intakes tokens associated with the single topic and outputs a probability of an output text based on each relative topic.

8. The computer-implemented method of claim 1, wherein the selecting based on the total probability vector involves identifying, by the one or more processors, a highest value probable text output within the total probability vector.

9. A system for predicting missing text, the system comprising:

a memory storing instructions; and a processor executing the instructions to perform a process including:

receiving a document containing the missing text;

tokenizing the document to generate one or more tokens representative of contents of the document;

applying a first machine-learning model to the tokenized document to generate a topic vector, the first machine-learning model trained to analyze the one or more tokens and identify recurring patterns of words or phrases indicative of one or more topics within the document, and generate the topic vector based on the one or more topics;

outputting the topic vector based on the applying of the first machine-learning model to the tokenized document;

processing the tokenized document with each of one or more expert machine-learning models, which are different from the first machine-learning model, to generate a string probability vector, each of the one or more expert machine-learning models associated with a corresponding topic among the one or more topics and trained to identify entities and probable text outputs associated with the corresponding topic included in the topic vector;

outputting the string probability vector for each of the one or more expert machine-learning models for the document;

calculating, based at least in part on the topic vector and the string probability vector for each of the one or more expert machine-learning models, a total probability vector comprising one or more probable text outputs for the document, wherein the calculating includes:

(i) multiplying, for the string probability vector for each of the one or more expert machine-learning models, each value within the string probability vector by an associated topic probability within the topic vector, thereby generating an adjusted string probability vector for each of the one or more expert machine-learning models; and (ii) summing one or more adjusted string probability vectors generated for the one or more expert machine-learning models, thereby generating the total probability vector; and selecting based on the total probability vector, a text output among the one or more probable text outputs to complete the missing text in the document.

10. The system of claim 9, wherein the first machine-learning model is a topic model, the topic model trained to associate a document with a probability of the document being related to one or more topics.

11. The system of claim 9, wherein the topic vector comprises a plurality of probabilities, each probability associated with a topic.

12. The system of claim 11, further comprising:

comparing each probability associated with a topic against a pre-defined probability threshold for each topic;

determining, for each topic, if the probability associated with the topic exceeds the pre-defined probability threshold for the topic; and assigning to the tokenized document a topic identifier, the topic identifier including each topic for which the probability associated with the topic exceeds the pre-defined probability threshold for the topic.

13. The system of claim 12, wherein the processing of the tokenized document with one or more expert machine-learning models based on the topic vector limits the processing of the tokenized document to only expert machine-learning models associated with topics that are present in a topic identifier of the tokenized document.

14. The system of claim 11, wherein each of the one or more expert machine-learning models is associated with a different topic.

15. The system of claim 14, wherein each of the one or more expert machine-learning models is trained relative to a single topic, such that each expert machine-learning model intakes tokens associated with the single topic and outputs a probability of an output text based on each relative topic.

16. The system of claim 9, wherein the selecting based on the total probability vector involves identifying a highest value probable text output within the total probability vector.

17. A computer-implemented method comprising:

receiving, by one or more processors, a data set containing missing text;

tokenizing, by the one or more processors, the data set to generate one or more tokens representative of contents of the data set;

applying, by the one or more processors, a topic model to the tokenized data set to output a topic vector comprising a plurality of probabilities, each probability associated with a topic, and the topic model trained to analyze the one or more tokens and identify recurring patterns of words or phrases indicative of one or more topics within the data set, and generate the topic vector based on the one or more topics;

comparing, by the one or more processors, each probability associated with a topic against a pre-defined probability threshold for each topic;

determining, by the one or more processors, for each topic, if the probability associated with the topic exceeds the pre-defined probability threshold for the topic;

assigning, by the one or more processors, to the data set a topic identifier, the topic identifier including each topic for which the probability associated with the topic exceeds the pre-defined probability threshold for the topic;

processing, by the one or more processors, the tokenized data set with each of one or more expert machine-learning models, which are different from the topic model, to generate a string probability vector, each of the one or more expert machine-learning models associated with a corresponding topic among the one or more topics and trained to identify entities and probable text outputs associated with the corresponding topic included in the topic vector;

outputting, by the one or more processors, the string probability vector for each of the one or more expert machine-learning models for the data set;

calculating, by the one or more processors, a total probability vector comprising one or more probable text outputs for the data set by:

(i) multiplying, by the one or more processors, for the string probability vector for each of the one or more expert machine-learning models, each value within the string probability vector by an associated topic probability within the topic vector, thereby generating an adjusted string probability vector for each of the one or more expert machine-learning models; and (ii) summing, by the one or more processors, one or more adjusted string probability vectors for the one or more expert machine-learning models, thereby producing a total probability vector; and selecting, by the one or more processors and based on the total probability vector, a text output among the one or more probable text outputs to complete the missing text in the data set.

18. The computer-implemented method of claim 17, wherein the topic model and the one or more expert machine-learning models are trained at a same time, resulting in a single model with layers representative of the topic model and the one or more expert machine-learning models as sub-models.

* * * * *